United States Patent [19]

Matsumoto

[11] Patent Number: 4,820,602
[45] Date of Patent: Apr. 11, 1989

[54] ELECTROPHOTOGRAPHIC PHOTOSENITIVE MEMBER COMPRISING DISAZO COMPOUNDS HAVING NON-SYMETRIC COUPLER PORTIONS

[75] Inventor: Masakazu Matsumoto, Yokohama, Japan

[73] Assignee: Canon Kabushiki Kaisha, Tokyo, Japan

[21] Appl. No.: 73,174

[22] Filed: Jul. 14, 1987

[30] Foreign Application Priority Data

Jul. 22, 1986 [JP] Japan ................................. 61-172579

[51] Int. Cl.$^4$ .............................................. G03G 5/14
[52] U.S. Cl. ......................................... 430/72; 430/78; 430/79
[58] Field of Search ............................. 430/72, 78, 79

[56] References Cited

U.S. PATENT DOCUMENTS 4,582,771 4/1986 Ohta ....................................... 430/79
4,631,242 12/1986 Emoto et al. .......................... 430/58
4,702,982 10/1987 Matsumoto et al. ................... 430/72

FOREIGN PATENT DOCUMENTS 3230208 9/1982 Fed. Rep. of Germany .

Primary Examiner—J. David Welsh
Attorney, Agent, or Firm—Fitzpatrick, Cella, Harper & Scinto

[57] ABSTRACT

An electrophotographic photosensitive member has a photosensitive layer on an electroconductive support, wherein said photosensitive layer contains a compound represented by the formula:

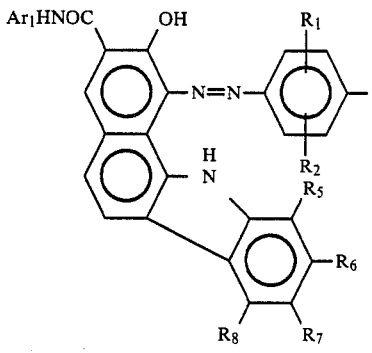

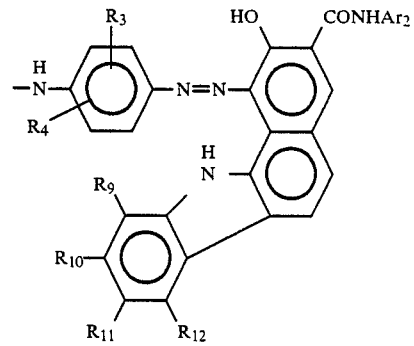

[wherein $Ar_1$ represents a phenyl group having one or more group selected from alkoxy groups and alkyl groups, $Ar_2$ represents a phenyl group having one or more group selected from nitro group, cyano group and halogen atoms, $R_1$, $R_2$, $R_3$, $R_4$, $R_5$, $R_6$, $R_7$, $R_8$, $R_9$, $R_{10}$, $R_{11}$ and $R_{12}$ represnt hydrogen atom, halogen atom, alkyl group, aralkyl group, alkoxy group, nitro group, cyano group, trifluoromethyl group or substituted amino group, with proviso that $R_5$ and $R_6$, $R_6$ and $R_7$, $R_7$ and $R_8$, $R_9$ and $R_{10}$, $R_{10}$ and $R_{11}$, $R_{11}$ and $R_{12}$ may form a fused aromatic ring together with a part of the carbazole ring].

An electrophotographyic apparatus is provided with at least an exposure means of a laser optical system and an electrophotographic photosensitive layer containing a compound represented by the above formula formed on a conductive substrate.

16 Claims, No Drawings

ELECTROPHOTOGRAPHIC PHOTOSENITIVE MEMBER COMPRISING DISAZO COMPOUNDS HAVING NON-SYMETRIC COUPLER PORTIONS

BACKGROUND OF THE INVENTION

1. Field of the Invention

This invention relates to an electrophotographic photosensitive member, more particularly to a photosensitive member which has a photosensitive layer containing an azo pigment having a specific molecular structure.

2. Related Background Art

Organic photoconductive members can be synthesized more easily than inorganic photoconductive members, and yet concerning visible light sensitivity, the sensitive wavelength region can be varied relatively easily by molecular design.

Accordingly, color sensitivity can be controlled, and also from the points such as no pollution as well as productivity and economy which are by far superior to inorganic semiconductors, various competitive companies are developing hastily organic photoconductive members. Many have reached practical levels such as sensitivity, durability, etc., but further improved levels are demanded.

On the other hand, in recent years, there is also arisen rapidly an increasing demand to extend the light-sensitive wavelength region of these organic photosensitive members to the near-infrared wavelength of semiconductor laser (under the present situation, practically most preferably 750 nm or longer, particularly around 780–800 nm, in respect of economy, output, matching with sensitive material, etc.) and use them as the photosensitive member for digital recording such as laser printer, etc. Looking back on the organic photosensitive members of the prior art from this standpoint, there have been proposed phthalocyanine pigments, aluminum phthalocyanine pigments as improvement of phthalocyanine pigments disclosed in U.S. Pat. No. 4,426,434, triphenylamine type trisazo pigments disclosed in U.S. Pat. Nos. 4,436,880 and 4,439,506, tetrakisazo pigments disclosed in U.S. Pat. No. 4,447,513, N-phenyl substituted type diphenylamine type disazopigments, diphenylamine type disazopigments disclosed in Japanese Laid-open Patent Publications Nos. 80643/1983 and 43662/1986, disazo pigments with two coupler portions different from each other and at least one coupler portion having $CF_3$ group, etc. as the photoconductive member for semiconductor laser.

However, when an organic photoconductive member is used as the photosensitive member for semiconductor laser, it is required that, first, the photosensitive wavelength region should be extended to longer wavelength region; next, sensitivity and durability should be good; since the wavelength of semiconductor laser varies depending on the temperature during use, sensitivity should be constant in the varying region. None of the above organic photoconductive members satisfy sufficiently these various conditions.

SUMMARY OF THE INVENTION

A first object of the present invention is to provide a novel electrophotographic photosensitive member.

Another object of the present invention is to provide an electrophotographic photosensitive member having practical high sensitivity characteristics in the visible region and stable potential characteristics during repeated uses.

A further object of the present invention is to provide an electrophotographic photosensitive member having a flat photosensitive wavelength region in the longer wavelength region.

Still another object of the present invention is to provide a novel photoconductive member for near-infrared ray, and a fifth object of the present invention is to provide an electrophotographic photosensitive member having practical high sensitivity characteristic and stable potential characteristic in repeated uses in a process in which a semiconductor laser is used for photosensitive member for digital recording such as laser copier, laser beam printer, etc.

According to one aspect of the present invention, there is provided an electrophotographic photosensitive member having a photosensitive layer on an electroconductive support, wherein said photosensitive layer contains a compound represented by the formula:

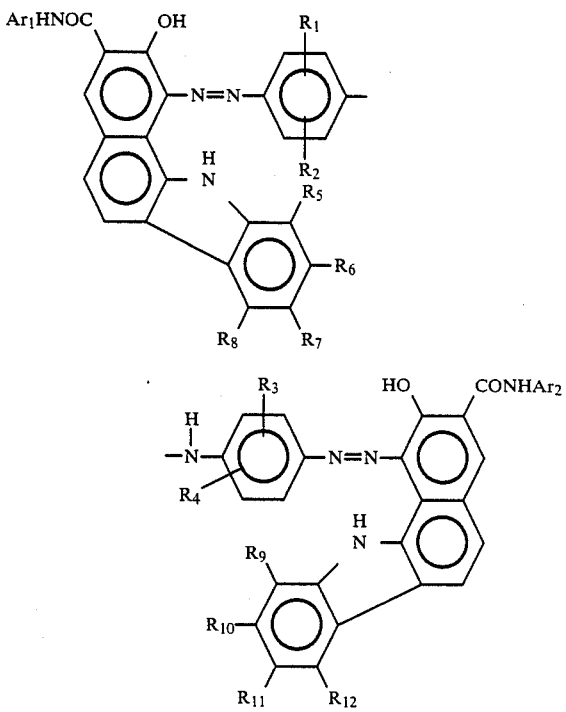

[wherein $Ar_1$ represents a phenyl groups having one or more group selected from alkoxy groups and alkyl groups, $Ar_2$ represents a phenyl group having one or more groups selected from nitro group, cyano group and halogen atoms, $R_1$, $R_2$, $R_3$, $R_4$, $R_5$, $R_6$, $R_7$, $R_8$, $R_9$, $R_{10}$, $R_{11}$ and $R_{12}$ represent hydrogen atom, halogen atom, alkyl group, aralkyl group, alkoxy group, nitro group, cyano group, trifluoromethyl group or substituted amino group, with proviso that $R_5$ and $R_6$, $R_6$ and $R_7$, $R_7$ and $R_8$, $R_9$ and $R_{10}$, $R_{10}$ and $R_{11}$, $R_{11}$ and $R_{12}$ may form a fused aromatic ring together with a part of the carbazole ring].

According to another aspect of the present invention, there is provided with an electrophotographic apparatus provided with at least an exposure means of a laser optical system and an electrophotographic photosensitive member having a photosensitive layer containing a compound represented by the following formula (1), formed on a conductive substrate:

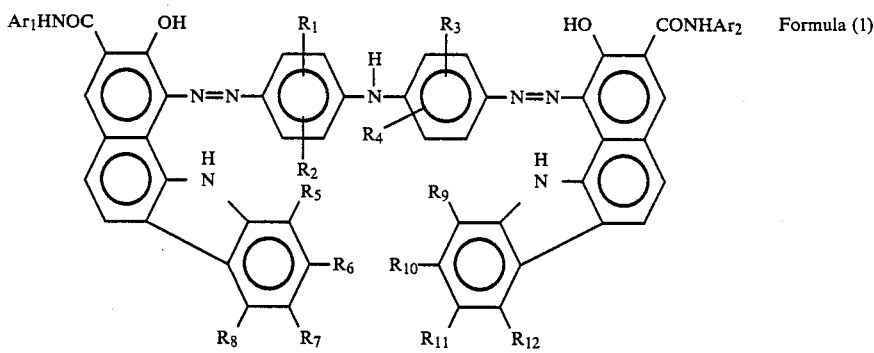
Formula (1)

[wherein Ar1 represents a phenyl group having one or more groups selected from alkoxy groups and alkyl groups, Ar2 represents a phenyl group having one or more groups selected from nitro group, cyano group and halogen atoms, $R_1$, $R_2$, $R_3$, $R_4$, $R_5$, $R_6$, $R_7$, $R_8$, $R_9$, $R_{10}$, $R_{11}$ and $R_{12}$ represent hydrogen atom, halogen atom, alkyl group, aralkyl group, alkoxy group, nitro group, cyano group, trifluoromethyl group or substituted amino group, with proviso that $R_5$ and $R_6$, $R_6$ and $R_7$, $R_7$ and $R_8$, $R_9$ and $R_{10}$, $R_{10}$ and $R_{11}$, $R_{11}$ and $R_{12}$ may form a fused aromatic ring together with a part of the carbazole ring].

DETAILED DESCRIPTION OF THE PREFERRED EMBODIMENTS

That is, the present invention is an electrophotographic photosensitive member containing a compound represented by the following formula (1) in the photosensitive layer:

Formula (1):

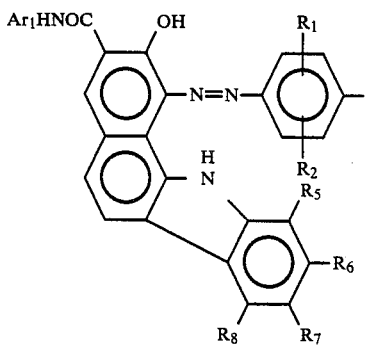

-continued

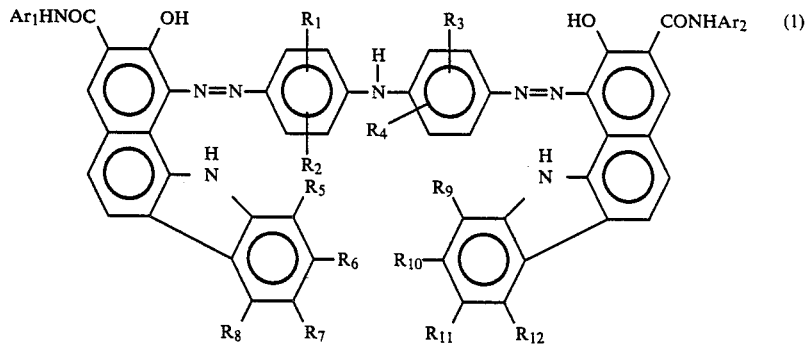

[wherein Ar1 represents a phenyl group having one or more groups selected from alkoxy groups and alkyl groups, Ar2 represents a phenyl group having one or more groups selected from nitro group, cyano group and halogen atoms, $R_1$, $R_2$, $R_3$, $R_4$, $R_5$, $R_6$, $R_7$, $R_8$, $R_9$, $R_{10}$, $R_{11}$ and $R_{12}$ represent hydrogen atom, halogen atom, alkyl group, aralkyl group, alkoxy group, nitro group, cyano group, trifluoromethyl group or substituted amino group, with proviso that $R_5$ and $R_6$, $R_6$ and $R_7$, $R_7$ and $R_8$, $R_9$ and $R_{10}$, $R_{10}$ and $R_{11}$, $R_{11}$ and $R_{12}$ may form a fused aromatic ring together with a part of the carbazole ring].

The present invention is described in detail below.

The present invention is characterized by containing an azo pigment having a coupler portion non-symmetric in left and right with diphenylamine as the center skeleton in the photosensitive member, and the azo pigment to be used in the present invention is a compound represented by the following formula (1).

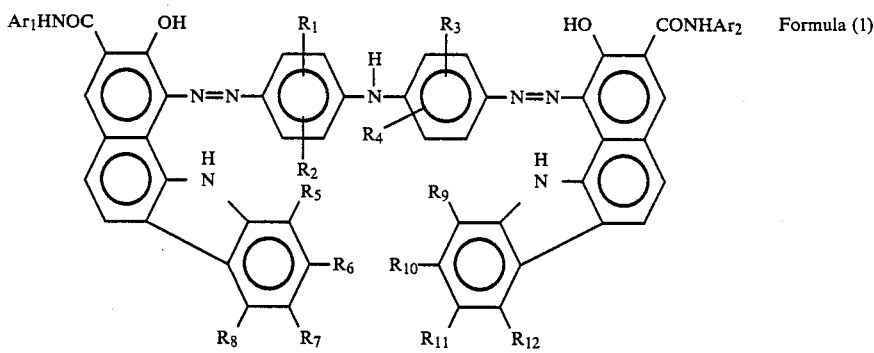 (1)

In the above formula, Ar1 represents a phenyl groups having one or more group selected from alkoxy groups such as methoxy, ethoxy, butoxy and the like, and alkyl groups such as methyl, ethyl, propyl, butyl and the like, Ar₂ represents a phenyl group having one or more groups selected from nitro group, cyano group and halogen atoms such as fluorine, chlorine, bromine, iodine, etc. $R_1$, $R_2$, $R_3$, $R_4$, $R_5$, $R_6$, $R_7$, $R_8$, $R_9$, $R_{10}$, $R_{11}$ and $R_{12}$ represent hydrogen atom, halogen atom such as fluorine, chlorine, bromine, iodine, etc., alkyl group such as methyl, ethyl, propyl, butyl and the like, aralkyl group such as benzyl, phenethyl, naphthylmethyl, etc., alkoxy group such as methoxy, ethoxy, butoxy and the like, nitro group, cyano group, trifluoromethyl group or substituted amino group such as dimethylamino, diethylamino, piperidino, etc. Also, $R_5$ and $R_6$, $R_6$ and $R_7$, $R_7$ and $R_8$, $R_9$ and $R_{10}$, $R_{10}$ and $R_{11}$, $R_{11}$ and $R_{12}$ may form a fused aromatic ring as shown below together with a part of the carbazole ring.

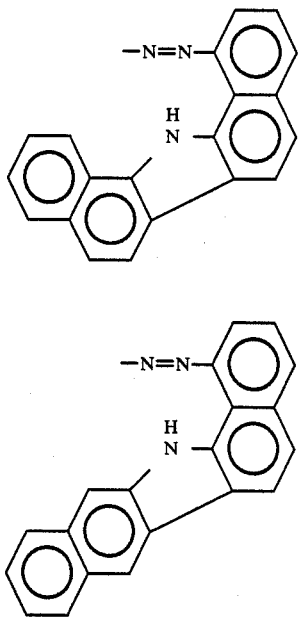

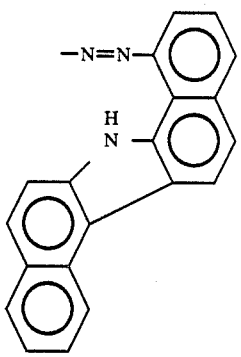

The effect according to the present invention may be considered to be attributable to the fact that the carrier formation efficiency becomes higher and also the carrier conveyability becomes improved, because the charges can be easily migrated through the diphenylamine structure having the lone electron pair of the center skeleton, since one of the coupler skeletons is a donor type substituent and the other is an acceptor type substituent.

Also, as observed between molecules, there occurs the effect of improving orientability (regular overlapping at the donor portion, acceptor portion), whereby it may be considered that particularly shifting to longer wavelength is effected to bring about a great effect. On the other hand, the benzcarbazole skeleton is an indispensable element in extending the large conjugation system and imparts flat characteristics.

All of the electrophotographic photosensitive members using the azo pigments according to the present invention are good in sensitivity and potential stability during prolonged usage, markedly shifting to longer wavelength, most of them having sensitivity up to 750 nm or higher, not a few thereof exceeding 800 nm.

By use of the azo pigment according to the present invention, higher sensitization and/or shifting of sensitive region to longer wavelength can be accomplished, with the result that application for high speed copying machine, laser beam printer, LED printer, liquid crystal printer, etc. has become possible, and further stable potential can be ensured, whereby beautiful images which are also stable as the image can be obtained.

Typical examples of the azo pigments to be used in the present invention are shown below:

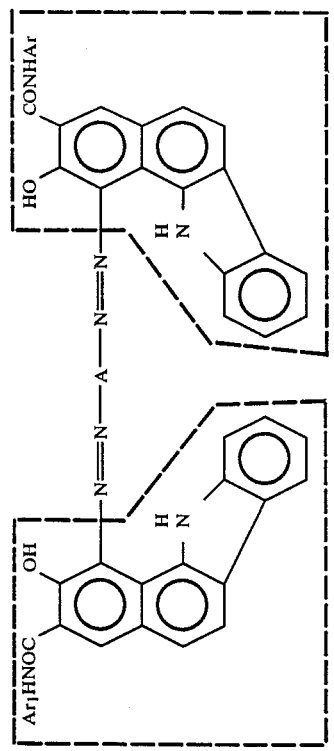
Pigments 1-24
| Pigment No. | A | B | C |
|---|---|---|---|
| 1 | 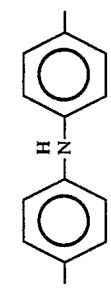 | 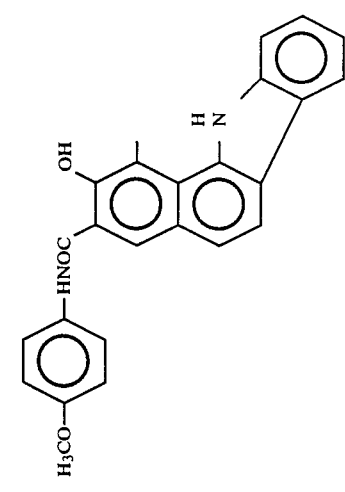 | 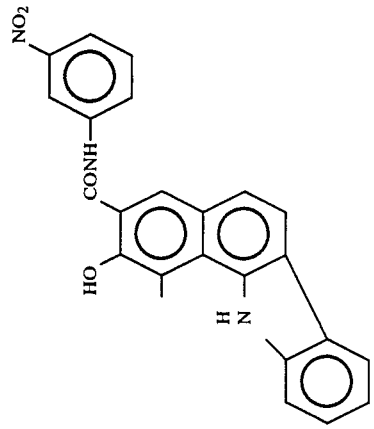 |

-continued
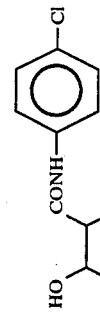
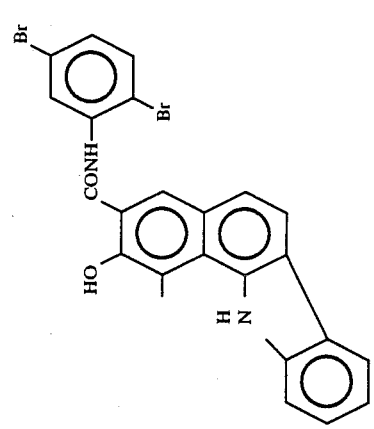
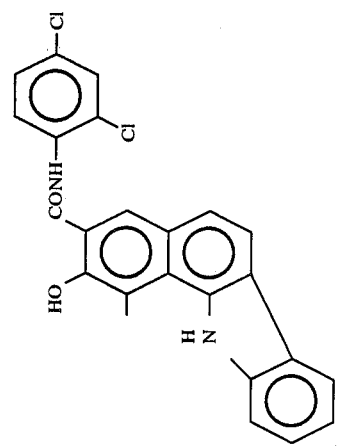
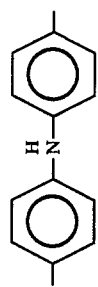
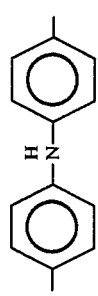
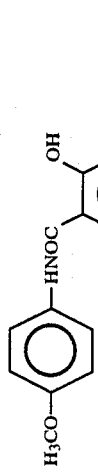
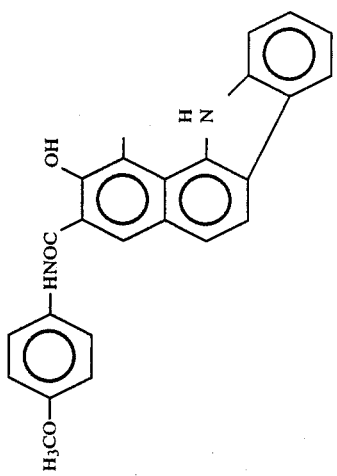

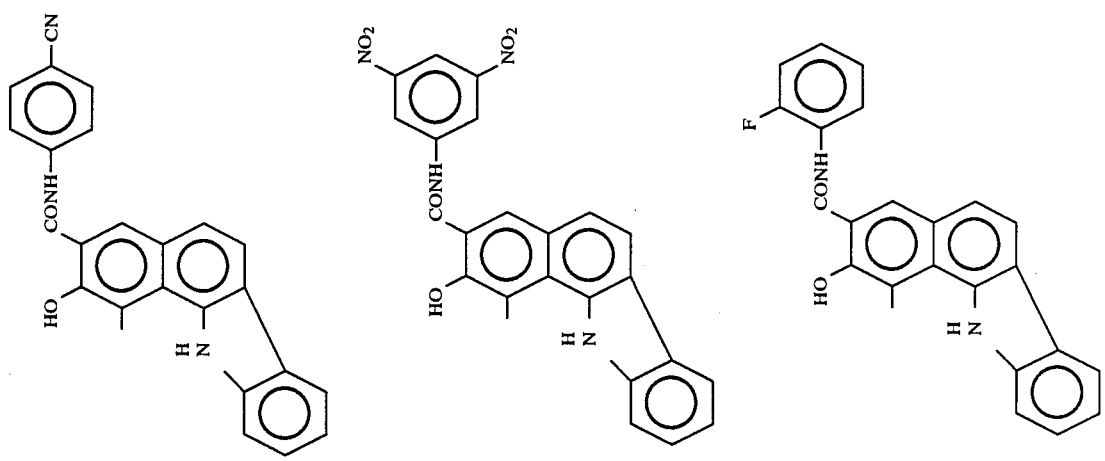
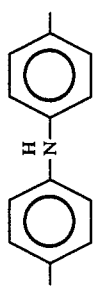
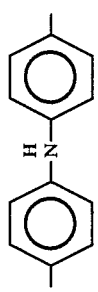
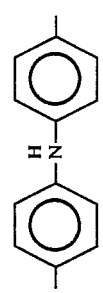
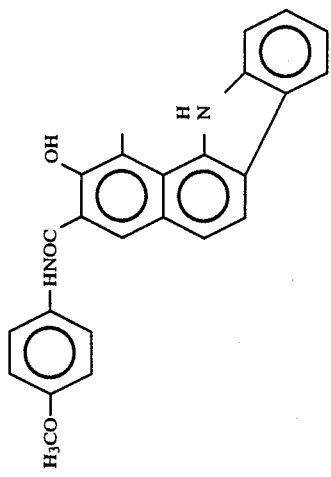
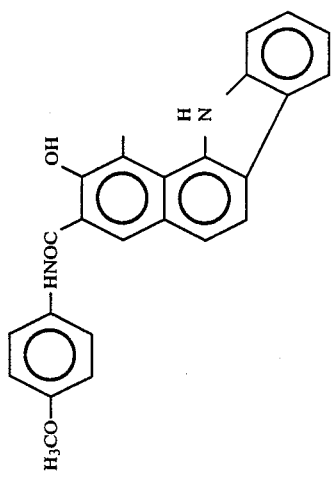
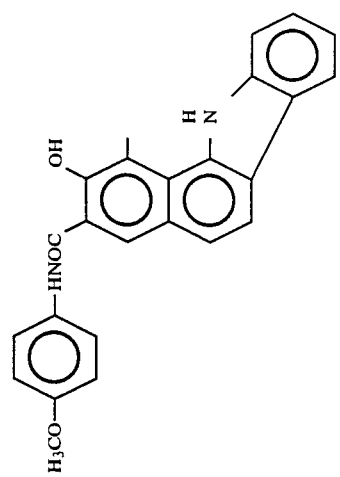

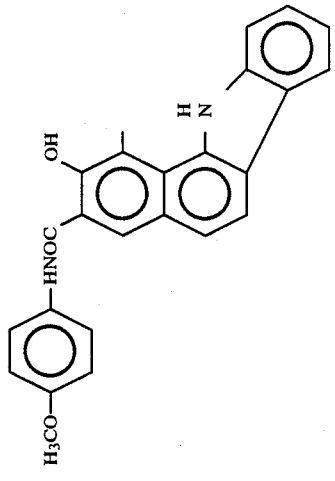
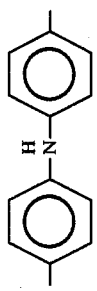
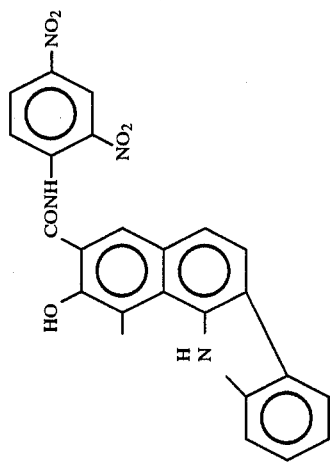
8
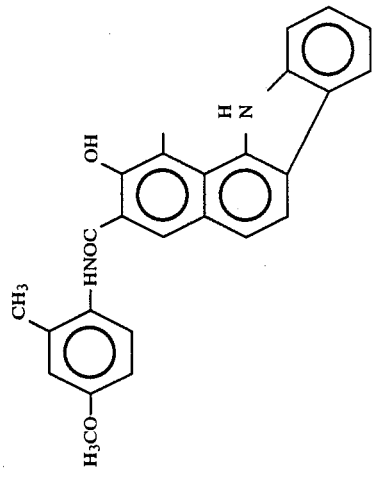
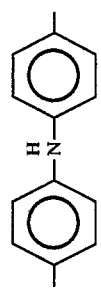
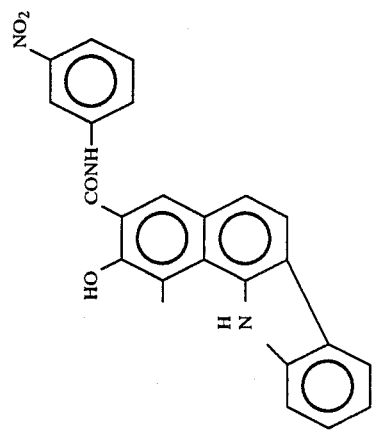
9

-continued
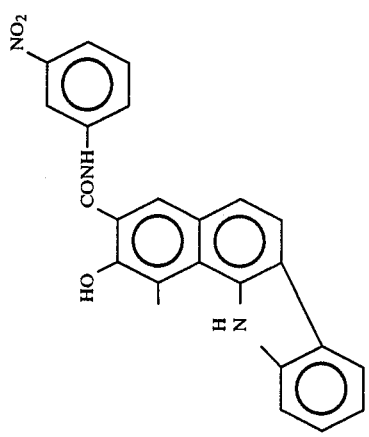
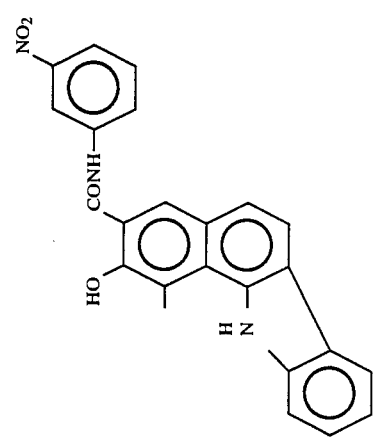
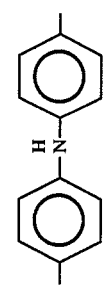
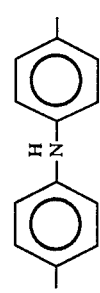
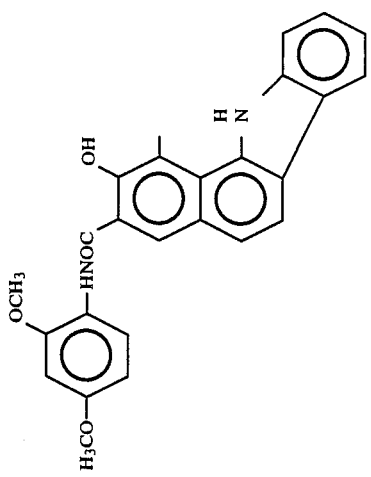
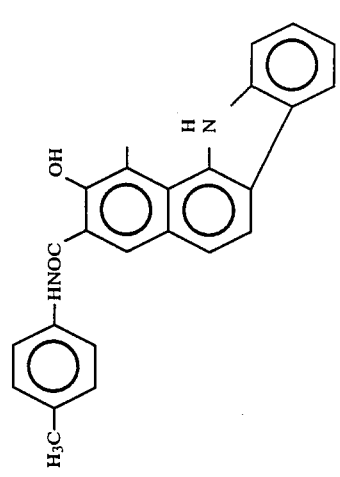
10
11

-continued
| | |
|---|---|
| 12 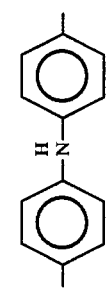 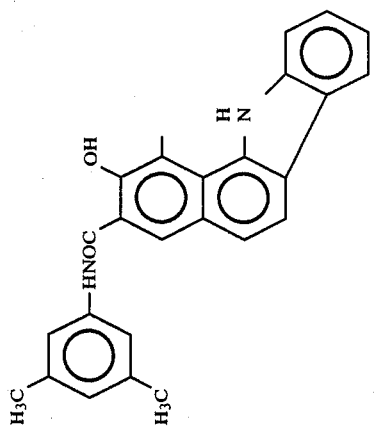 | 13 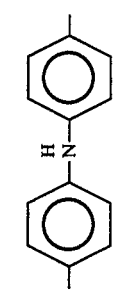 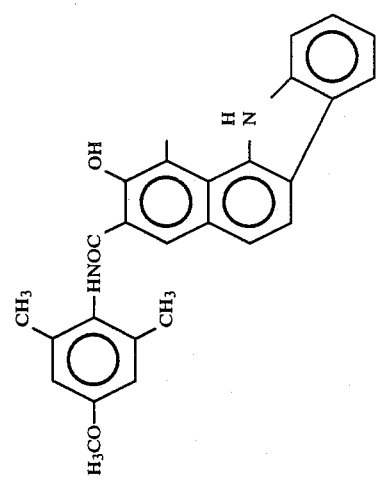 |
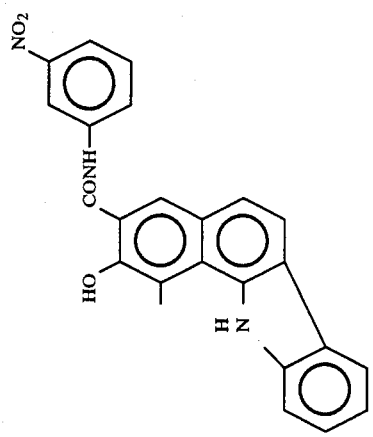
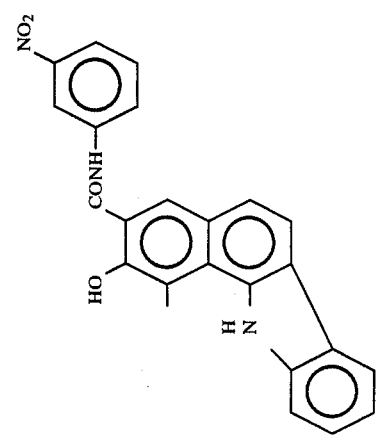

-continued
14 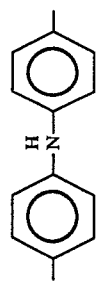 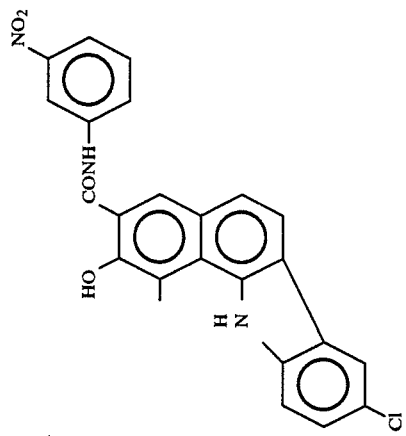
15 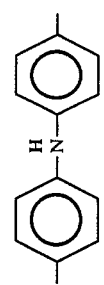 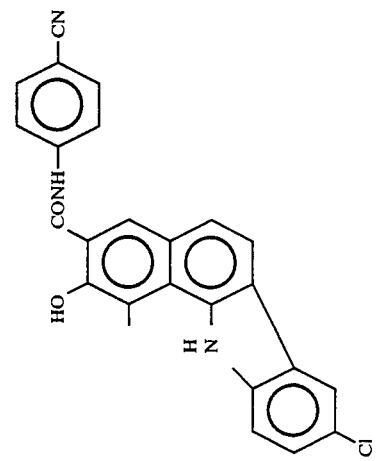

-continued
| | |
|---|---|
| 16 | 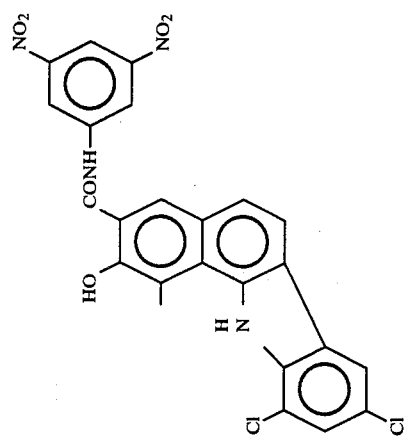 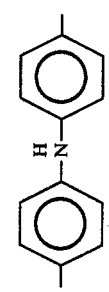 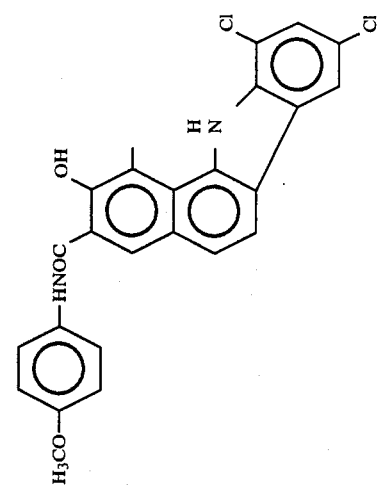 |
| 17 | 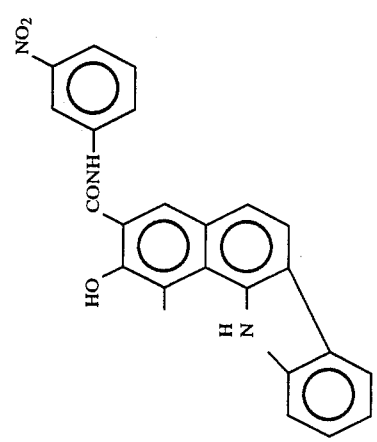 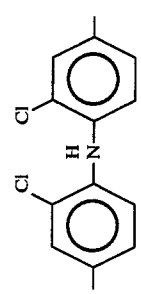 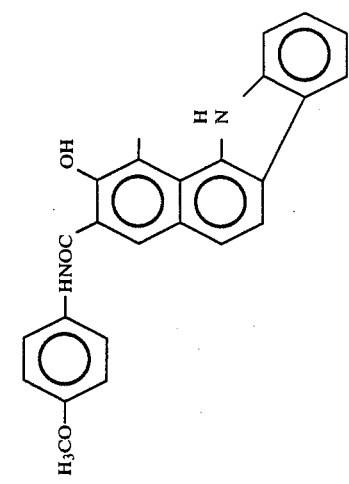 |

-continued
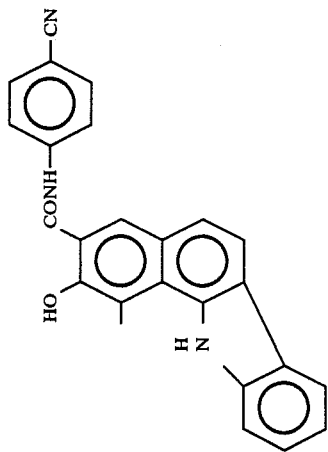
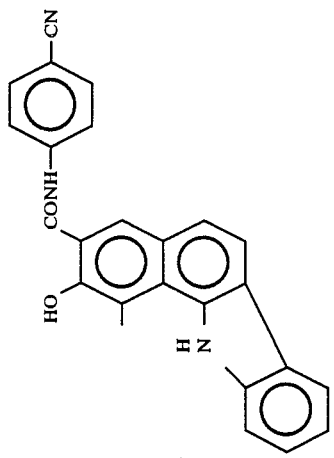
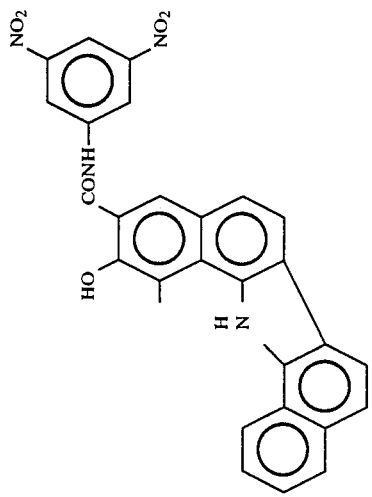
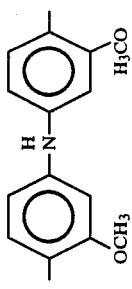
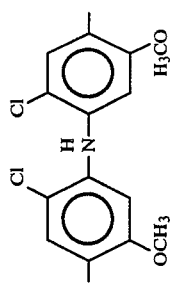
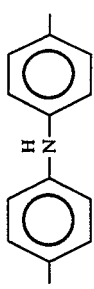
18
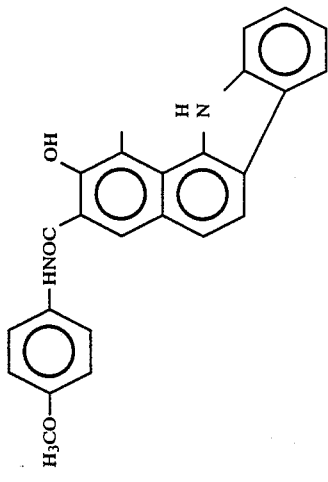
19
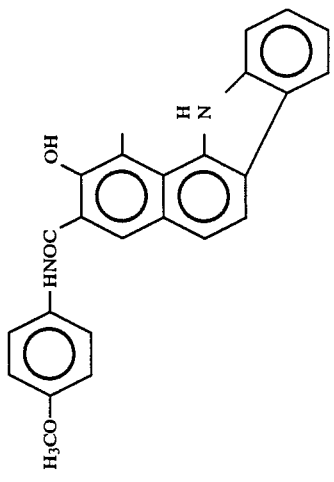
20
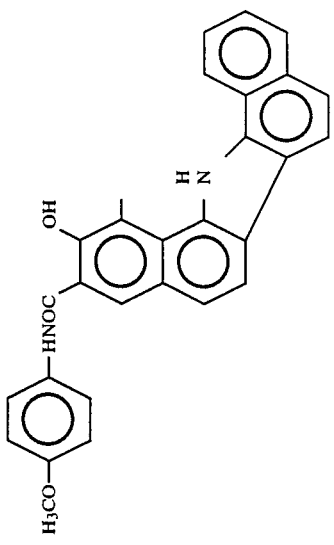

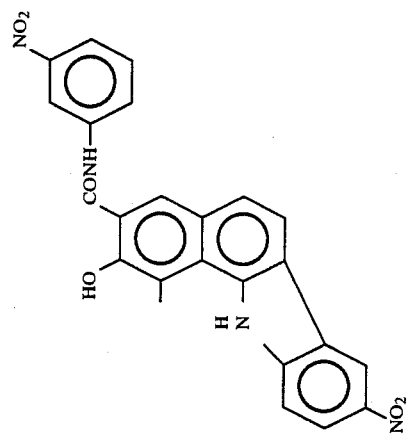
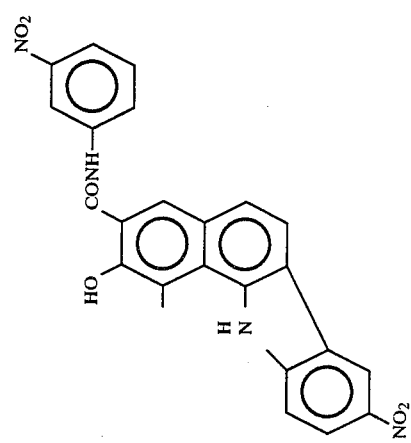
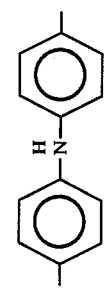
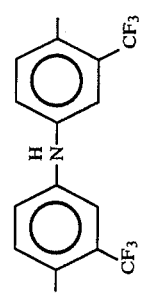
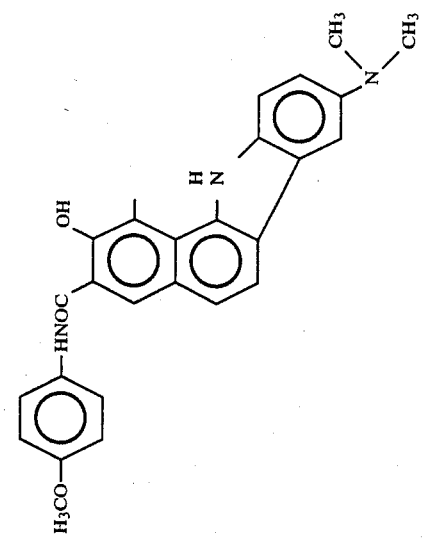
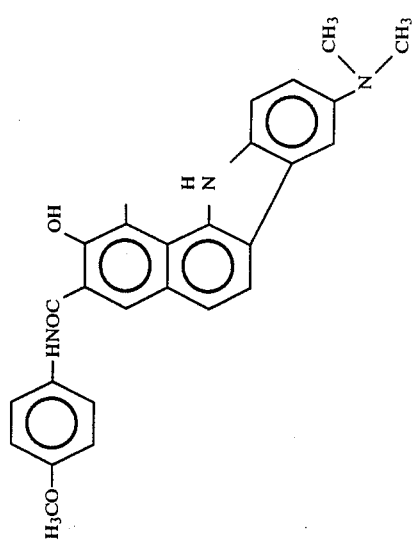

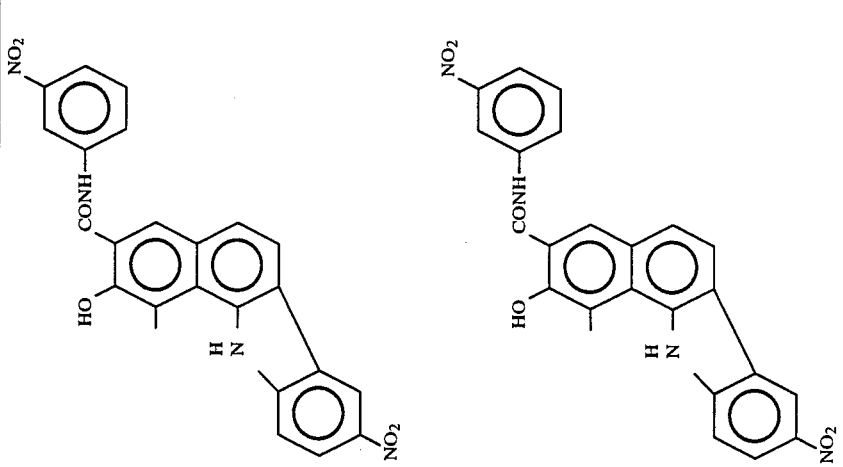
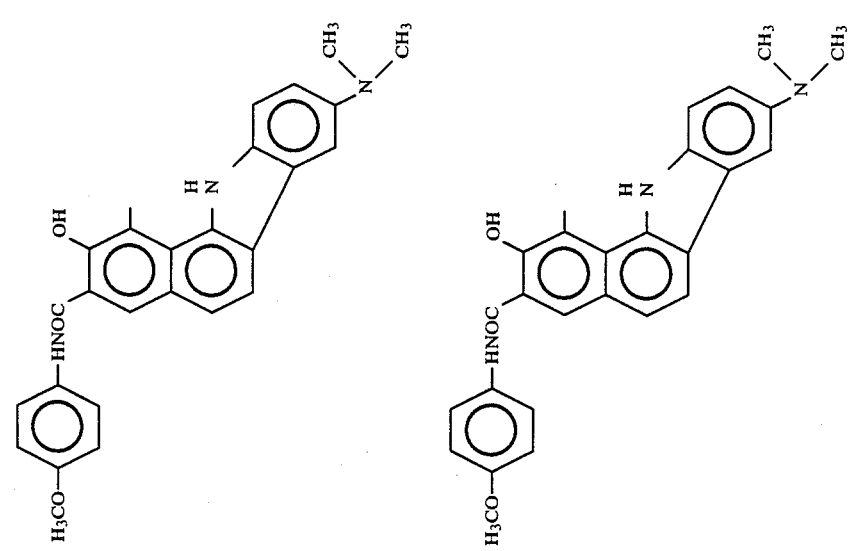

These pigments can be used as a single species or a combination of two or more species.

These pigments to be used in the present invention can be prepared, for example, according to the two step coupling method in which 4,4'-diamino diphenylamine or a derivative thereof is converted into diazonium by treatment with an equimolar sulfite in a conventional manner at $-10°$ C., then subjected to aqueous coupling with a coupler represented by the formula (2) (wherein $Ar_1$, $R_5$, $R_6$, $R_7$ and $R_8$ represent the same meanings as shown for the formula (1):

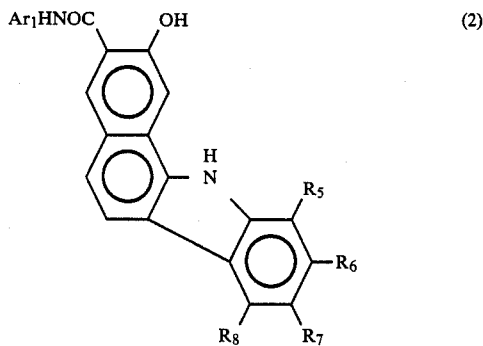

(2)

in the presence of an equimolar alkali, further converted to diazonium again with an equimolar sulfite and subsequently subjected to aqueous coupling with a coupler represented by the following formula (3) (wherein $Ar_2$, $R_9$, $R_{10}$, $R_{11}$ and $R_{12}$ represent the same meanings as shown for the formula (1)):

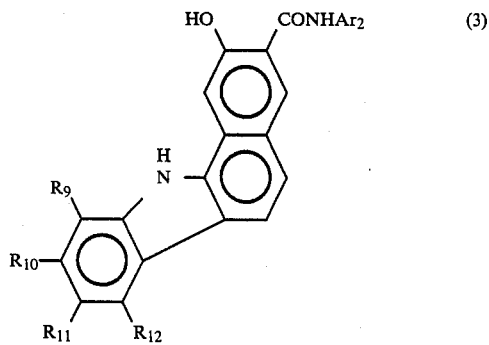

(3)

in the presence of an alkali.

Also, these pigment can be prepared according to the two step coupling method even when non-aqueous solvent such as DMF and the like is used. Further, in case reaction rate constants of two kinds of couplers are very different, these pigments can be also prepared by adding a coupler liquid containing alkali simultaneously with or after tetrazotization.

Next, a typical synthesis example of the azo pigment to be used in the present invention is shown below.

Synthesis example 1 (Synthesis of the above exemplary azo pigment No. 1)

Into a one liter beaker were charged 80 ml of water and 16.6 ml (0.19 mol) of conc. hydrochloric acid and, while under cooling in a cold bath to 3° C., 5.75 g (0.029 mol) of 4,4'-diaminodiphenylamine was added, and the liquid temperature was maintained at 3° C. under stirring. Next, a solution of 2.2 g (0.032 mol) of sodium sulfite dissolved in 5 ml of water was added dropwise while controlling the liquid temperature at 5° C. or lower over 10 minutes, and after the dropwise addition, the mixture was stirred for 30 minutes and thereafter cooled to $-10°$ C. On the other hand, into a one liter beaker were charged 200 ml of dimethylformamide and 200 ml of water, followed by addition of 11.4 g (0.285 mol) of sodium hydroxide, and 11.1 g (0.029 mol) of 2-hydroxy-3-benzazilic acid-4'-methoxyanilide was added to be dissolved therein. The coupler solution was cooled to $-10°$ C. and added dropwise into the previous diazonium solution over about 10 minutes, and further left to stand under stirring for one hour. Next, the reaction mixture was made 0° C. and, with addition of 24.9 ml (0.285 mol) of conc. hydrochloric acid, a solution of 2.2 g (0.032 mol) of sodium sulfite dissolved in 5 ml of water was added similarly as described above over 10 minutes to form again a diazonium salt solution.

Next, into a 2 liter beaker were charged 200 ml of dimethyl-formamide and 200 ml of water and, with addition of 11.4 g (0.285 mol) of sodium hydroxide, 11.5 g (0.029 mol) of 2-hydroxy-3-benzazilic acid-3'-nitroanilide was added to be dissolved therein and cooled to 0° C. Into this coupler solution, the previous diazonium salt solution was added over 30 minutes at 3° C. or lower, and then the mixture was stirred at room temperature for 2 hours, and further left to stand overnight. The reaction mixture was filtered, washed with water and filtered to give 26.9 g of water paste of a crude pigment as calculated on solids.

Next, stirring filtrtion was repeated four times at room temperature with the use of 400 ml of N,N-dimethylformamide. Then, after repeating stirring and filtration twice each with 400 ml of methyl ethyl ketone, the product was dried at room temperature under reduced pressure to give 24.7 g of a purified pigment. The yield was 85.0%. m.p. 250° C. or higher.

| Elemental analysis | Calcd. (%) | Found (%) |
| --- | --- | --- |
| C | 70.72 | 70.60 |
| H | 4.12 | 4.10 |
| N | 13.98 | 13.80 |

Having described above about the synthetic method of a typical pigment, other azo pigments shown by the formula (1) can be also synthesized similarly.

The coating having the azo pigment as described above exhibits photoconductivity and therefore can be used in the photosensitive layer of the electrophotographic photosensitive member as described below.

That is, in specific examples of the present invention, photosensitive members can be prepared by forming coatings by incorporting the azo pigment as described as dispersed in an appropriate binder.

According to preferable examples of the present invention, the photoconductive coating as described above is applicable as the charge generation layer in the electrophotographic photosensitive member in which the photosensitive layer of the electrophotographic photosensitive member is separated in function into the charge generation layer and the charge transport layer.

The charge generation layer, in order to obtain sufficient absorbance, should preferably contain the azo pigment exhibiting photoconductivity as much as possible, and also be formed as a thin film layer having, for example, a film thickness of 5 $\mu$m or less, preferably 0.01 to 1 $\mu$m, for efficient transport of the charge carriers generated to the interface with the charge transport layer or to the interface with the electroconductive support. This is due to the fact that most of the incident dose is absorbed at the charge generation layer to form much charge carriers, and further the charge carriers generated are required to be injected into the charge transport layer without recombination or trap.

The charge generation can be formed by dispersing the above azo pigment in a suitable binder and applying the dispersion on a support. The binder which can be used during formation of the charge generation layer by coating can be selected from a wide scope of insulating resins, and also from organic photoconductive polymers such as poly-N-vinylcarbazole, polyvinylanthracene or polyvinylpyrene. Preferably, there may be included insulating resins, such as polyvinyl butyral, polyvinyl benzal, polyarylate (polycondensate of bisphenol A with phthalic acid, etc.), polycarbonate, polyester, phenoxy resin, polyvinyl acetate, acrylic resin, polyacrylamide resin, polyamide, polyvinylpyridine, cellulose type resin, urethane resin, epoxy resin, casein, polyvinyl alcohol, polyvinyl pyrrolidone, etc. The resin to be incorporated in the charge generation layer may be suitably 80 wt.% or less, preferably 40 wt.% or less.

The charge transport layer is contacted electrically the charge generation layer described above, receives charge carriers injected from the charge generation layer in present of an electric field and has function transporting the charge carriers to the surface. In this case, the charge transport layer may be laminated on or under the charge generation layer.

The substance for transporting charge carriers in the charge transport layer (hereinafter merely called charge transport substance) when the charge transport layer is formed on the charge generation layer may be preferably non-responsive to the wavelength of the electromagnetic wave responsive to the charge generation layers as described above. The "electromagnetic wave" as herein mentioned is inclusive of the definition of "ray" in broad sense, including gamma-ray, X-ray, UV-ray, visible ray, near-infrared ray, infrared ray, far-infrared ray, etc. When the light responsive wavelength region of the charge transport layer coincides with or overlaps that of the charge generation layer, the charge carriers generated in both are trapped with each other, consequently causing lowering in sensitivity.

As the charge transporting substance, there are electron transportable substances and positive hole transportable substances, and examples of electron transportable substances may include electron attracting substances such as chloroanil, tetracyanoethylene, tetracyanoquinodimethane, 2,4,5,7-tetranitro-9-fluorenone, 2,4,5,7-tetranitroxanthone, 2,4,8-trinitro-thioxanthone, and polymers formed from these electron attracting substances.

Examples of positive hole transportable substances may include pyrene; N-ethylcarbazole; N-methyl-N-phenylhydrazino-3-methylidene-9-ethylcarbazole; N,N-diphenyl-hydrazino-3-methylidene-10-ethyl-phenothiazine; hydrazones such as p-diethylaminobenzaldehyde-N,N-diphenylhydrazone, p-pyrrolidino-benzaldehyde-N,N-diphenylhydrazone, p-diethylbenzaldehyde-3-methylbenzthiazolinone-2-hydrozone, etc.; 2,5-bis-(p-diethyl-aminophenyl)-1,3,4-oxadiazole; pyrazolines such as 1-phenyl-3-(p-diethylaminostyryl)-5-(p-diethylaminophenyl)pyrazoline, 1-[pyridiyl(2)]-3-(p-diethylaminostyryl)-5-(p-diethylaminophenyl)pyrazoline, 1-[pyridiyl(3)]-3-(p-diethyl-aminostyryl)-5-(p-diethylaminophenyl)pyrazoline, 1-[pyridiyl-(2)]-3-(p-diethylaminostyryl)-4-methyl-5-(p-diethylaminophenyl)- pyrazoline, 1-phenyl-3-(P-diethylaminostyryl)-4-methyl-5-(P-diethylaminophenyl)pyrazoline, spiropyrazoline, etc.; oxazole type compounds such as 2-(p-diethylaminostyryl)-6-diethylaminobenzoxazole, 2-(p-diethylaminophenyl)-4-(p-dimethylaminophenyl)-5-(2-chlorophenyl)oxazole, etc.; thiazole type compounds such as 2-(p-diethyl-aminostyryl)-6-diethylaminobenzothiazole, etc.; triarylmethane type compounds such as bis(4-diethylamino-2-methylphenyl)phenyl-methane, etc.; polyarylalkanes such as 1,1-bis(4.-N,N-diethylamino-2-methylphenyl)heptane, 1,1,2,2-tetrakis(4-N,N-dimethyl-amino-2-methylphenyl)ethane, etc.; triphenylamine; stilbene derivatives; poly-n-vinylcarbazole; polyvinylpyrene; polyvinyl-anthracene; polyvinylacridine; poly-9-vinylphenylanthracene; pyrene-formaldehyde resin; ethylcarbazole-formaldehyde resin; and so on.

Other than these organic charge transport substances, it is also possible to use inorganic material such as selenium, selenium-tellurium, amorphous silicon, cadmium sulfide, etc.

Also, these charge transport substances can be used as single species or as a combination of two or more species.

When the charge transport substance has no film forming property, coating can be formed by selection of a suitable binder. The resin which can be used as the binder resin may include, for example, insulating resins such as acrylic resin, polyarylate, polyester, polycarbonate, polystyrene, acrylonitrile-styrene copolymer, acrylonitrile-butadiene copolymer, polyvinyl butyral, polyvinyl formal, polysulfone, polyacrylamide, polyamide, chlorinated rubber etc., or organic photoconductive polymers such as poly-N-vinylcarbazole, polyvinylanthracene, polyvinylpyrene, etc.

The charge transport layer cannot be made thicker than is necessary, because there is the limit capable of transporting charge carriers. Generally speaking, it may be 5 μm to 30 μm, but preferably within the range of 8 μm to 20 μm. In forming the charge transport layer by coating, suitable coating methods as described above can be employed.

The photosensitive layer comprising such a laminated structure of charge generation layer and charge transport layer is provided on an electroconductive support. As the electroconductive support, one having itself electroconductivity, for example, aluminum, aluminum alloy, copper, zinc, stainless steel, vanadium, molybdenum, chromium, titanium, nickel, indium, gold or platinum can be used. Otherwise, it is also possible to use plastics (e.g. polyethylene, polypropylene, polyvinyl chloride, polyethylene terephthalate, acrylic resin, polyfluoroethylene, etc.) having coating of aluminum, aluminum alloy, indium oxide, tin oxide, indium oxide-tin oxide alloy, etc. formed thereon according to the vacuum deposition method, supports coated with electroconductive particles (e.g. aluminum powder, titanium oxide, tin oxide, zinc oxide, carbon black, silver particles, etc.) together with a suitable binder on plastics or the above electroconductive supports, supports of plastics or papers impregnated with electroconductive particles, or plastics having electroconductive polymers, etc.

Between the electroconductive support and the photosensitive member, a subbing layer having the barrier function and adhesion function can be also provided. The subbing layer can be formed of casein, polyvinyl alcohol, nitrocellulose, ethylene-acrylic acid copolymer, polyamide (nylon 6, nylon 66, nylon 610, copolymer nylon, alkoxymethylated nylon, etc.), polyurethane, gelatin, aluminum oxide and others.

The film thickness of the subbing layer may be suitably 0.1 to 5 μm, preferably 0.5 to 3 μm.

In the case of using a photosensitive member comprising an electroconductive support, a charge generation layer and a charge transport layer laminated in this order, when the charge transport substance comprises an electron transportable substance, the charge transport layer surface is required to be positively charged, and when exposure is effected after charging, the electrons formed in the charge generation layer are injected into the charge transport layer at the exposed portion and thereafter reach the surface to neutralize the positive charges, thereby effecting decay of the surface potential to create electrostatic contrast between the exposed portion and the unexposed portion. The electrostatic latent image thus formed can be developed with a negatively chargeable toner to obtain a visible image. This can be directly fixed or, after the toner image is transferred onto a paper or a plastic film, etc., developing and fixing can be effected.

Also, it is also possible to employ the method in which the electrostatic latent image on the photosensitive member is transferred onto an insulating layer of the transfer paper, followed by developing and fixing. The kind of the developing agent, the developing method and the fixing method may be selected from any of known materials and known methods, which are not limited to specific ones.

On the other hand, when the charge transport substance comprises a positive hole transportable substance, the charge transport layer surface is required to be negatively charged, and when exposure is effected after charging, the positive holes formed in the charge generation layer are injected into the charge transport layer at the exposed portion and thereafter reach the surface to neutralize the negative charges, thereby effecting decay of the surface potential to create electrostatic contrast between the exposed portion and the unexposed portion. During developing, it is necessary to use a positively chargeable toner, as contrary to the case when an electron transportable substance is used.

In the case of using a photosensitive member comprising an electroconductive support, a charge transport layer and a charge generation layer laminated in this order, when the charge transport substance comprises an electron transportable substance, the charge generation layer surface is required to be negatively charged, and when exposure is effected after charging, the electrons formed in the charge generation layer are injected into the charge transport layer at the exposed portion and thereafter reach the support. On the other hand, the positive holes generated in the charge generation layer reach the surface to effect decay of the surface potential, whereby electrostatic contrast is created between the exposed portion and the unexposed portion. The electrostatic latent image thus formed can be developed with a positively chargeable toner to give a visible image. This can be directly fixed or the toner image can be transferred onto a paper or plastic film, etc. before developing and fixing. Also, it is possible to employ the method in which the electrostatic latent image on the photosensitive member is transferred onto the insulating layer of a transfer paper before developing and fixing. The kind of the developing agent, the developing method and the fixing method are not particularly limited, but any known material or known method may be available.

On the other hand, when the charge transport layer comprises a positive hole transportable substance, the charge generation layer surface is required to be positively charged, and when exposure is effected after charging, the positive holes generated in the charge transport layer are injected into the charge transport layer at the exposed portion and thereafter reach the support. On the other hand, the electrons generated in the charge generation layer reach the surface to effect decay of the surface potential, whereby electrostatic contrast is formed between the exposed portion and the unexposed portion. During developing, it is necessary to use a negatively chargeable toner as contrary to the case when using the electron transportable substance.

As another specific example of the present invention, a photosensitive member incorporating an azo pigment represented by the formula (1) as described above together with a charge transport substance in the same layer may be employed. In this case, other than the charge transport substance as described above, a charge transfer complex compound comprising a poly-N-vinylcarbazole and trinitrofluorenone can be used. The electrophotographic photosensitive member of this example can be prepared by dispersing the azo pigment and the charge transfer complex compound in a polyester solution dissolved in tetrahydrofuran, followed by formation of a coating.

In any of the photosensitive members, the pigments employed contain at least one pigment selected from the azo pigments represented by the formula (1), and its crystal form may be either amorphous or crystalline.

Also, it is possible to enhance sensitivity of the photosensitive member by using pigments with different light absorptions in combination if desired, or to combine two or more kinds of the azo pigments represented by the formula (1) for the purpose of obtain a panchromatic photosensitive member, or to use the pigment in combination with charge generation substances selected from known dyes and pigments.

The present invention is described below by referring to Examples.

EXAMPLES 1-15

On an aluminum plate, an aqueous ammoniacal solution of casein (casein 11.2%, ammonia water 1 g, water 222 ml) was applied by a Meyer bar to a film thickness after drying of 1.0 μm, followed by drying.

Next, 5 g of the above exemplary azo pigment No. 1 was added into a solution of 2 g of a butyral resin (degree of butyral formation 63 mol%) dissolved in 95 ml of ethanol, and the mixture was dispersed in a sand mill for 2 hours. The dispersion was applied on the previously formed casein layer by a Meyer bar to a film thickness after drying of 0.5 μm, followed by drying, to form a charge generation layer.

Subsequently, 5 g of a hydrazone compound of the structural formula:

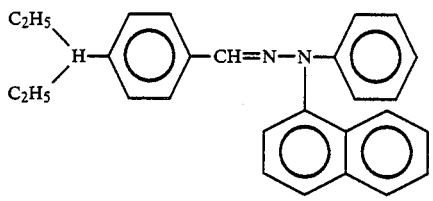

and 5 g of a polymethyl methacrylate resin (number average molecular weight 100000) were dissolved in 70 ml of benzene, and the resultant solution was applied on the charge generation layer by a Meyer bar to a thickness after drying of 20 μm, followed by drying, to form a charge transport layer, thus forming a photosensitive member of Example 1. Photosensitive members corresponding to Examples 2-15 were prepared by use of other exemplary pigments shown in Table 1 in place of the azo pigment No. 1.

The electrophotographic photosensitive member thus prepared was subjected to corona charging at −5 KV according to the static system by use of an electrostatic copying paper testing device (Model SP-428, produced by Kawaguchi Denki K.K.), maintained in a dark place for one second and then exposed at a luminance of 2 lux for examination of charging characteristics. As the charging characteristic, the surface potential ($V_0$) and the exposure dosage necessary for decaying the potential to ½ when dark decayed for one second were measured. The results are shown in Table 1.

Comparative examples 1-6

By use of the azo pigments having the structures as shown below in place of the pigment used in Example 1, photosensitive members were prepared similarly and evaluated similarly. The evaluation results of Comparative examples 1-6 are summarized in Table 1 together with the results of Examples 1-15.

| Comparative Pigment No. | Structure |
|---|---|
| 1 | |
| 2 | |
| 3 | |

-continued

| Comparative Pigment No. | Structure |
|---|---|
| 4 | 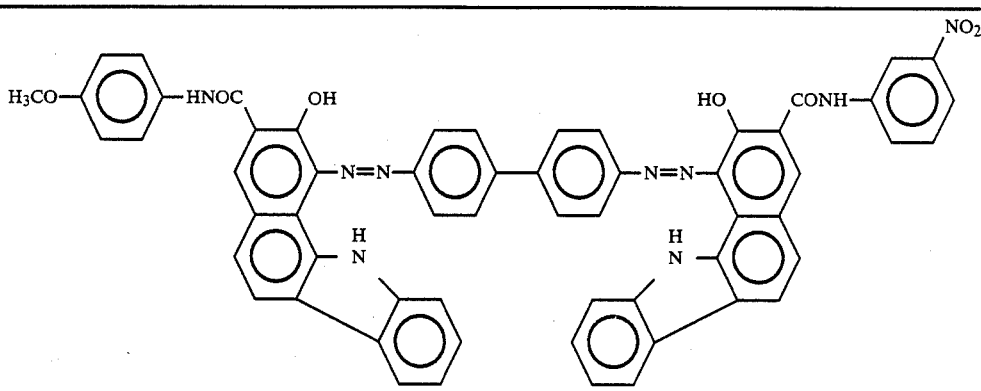 |
| 5 | 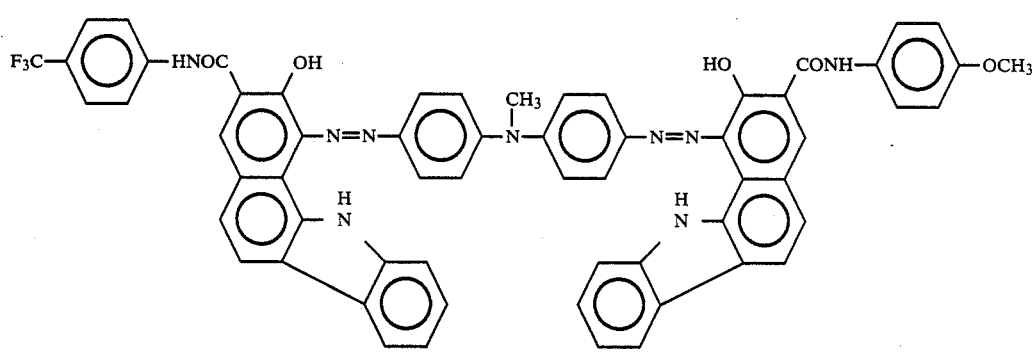 |
| 6 | 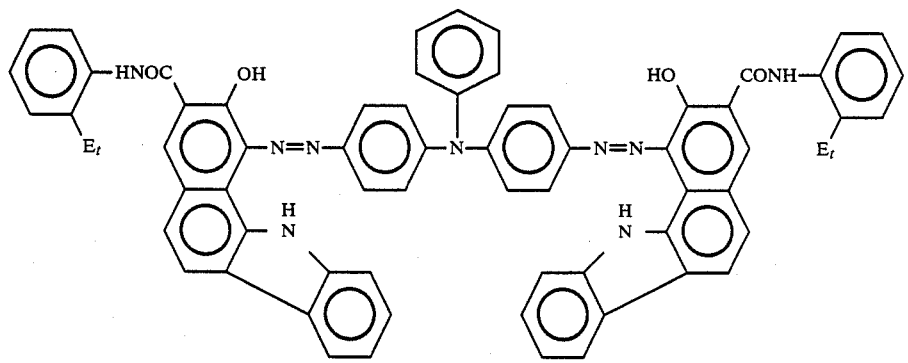 |

TABLE 1

| Example | Azo pigment exemplary NO. | $V_o$ (−V) | $E_{\frac{1}{2}}$ (l · S) |
|---|---|---|---|
| 1 | 1 | 700 | 1.8 |
| 2 | 2 | 700 | 2.0 |
| 3 | 3 | 700 | 2.0 |
| 4 | 4 | 695 | 1.9 |
| 5 | 5 | 685 | 2.3 |
| 6 | 6 | 705 | 1.6 |
| 7 | 7 | 700 | 1.6 |
| 8 | 8 | 705 | 2.2 |
| 9 | 9 | 695 | 1.9 |
| 10 | 13 | 690 | 2.6 |
| 11 | 14 | 700 | 1.8 |
| 12 | 16 | 700 | 1.7 |
| 13 | 17 | 710 | 2.8 |
| 14 | 20 | 700 | 1.6 |
| 15 | 22 | 705 | 1.6 |

TABLE 1-continued

| Comparative Example | Azo pigment exemplary NO. | $V_o$ (−V) | $E_{\frac{1}{2}}$ (l · S) |
|---|---|---|---|
| 1 | 1 | 655 | 8.8 |
| 2 | 2 | 705 | 6.5 |
| 3 | 3 | 700 | 5.5 |
| 4 | 4 | 705 | 5.5 |
| 5 | 5 | 690 | 6.2 |
| 6 | 6 | 705 | 10.1 |

From the results in Table 1, it can be appreciated that all of the photosensitive members according to the present invention have sufficient charging ability and sufficient sensitivity.

EXAMPLES 16-39

The above exemplary azo pigment No. 7 (5 g) was added into a solution of 2 g of a benzal resin (synthesized from benzal and Poval with a polymerization degree of 500, degree of benzal formation 70 mol) dissolved in 95 ml of methyl isobutyl ketone, and the mixture was stirred in a sand mill for 4 hours. The dispersion was applied on an aluminum plate by a Meyer bar to a film thickness after drying of 0.5 μm to form a charge generation layer. Next, 5 g of a stilbene type compound of the structural formula:

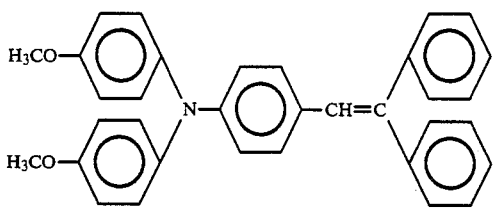

and 5 g of a polymethyl methacrylate (number average molecular weight 100000) were dissolved in 70 ml of benzene, and the resultant solution was applied on the charge generation layer by a Meyer bar to a film thickness after drying of 20 μm, followed by drying, to form a charge transport layer, thus preparing a photosensitive member of Example 16.

Also, photosensitive members were prepared similarly as Example 16 by use of other exemplary pigments shown in Table 2 in place of the azo pigment No. 7.

The photosensitive member thus prepared was subjected to corona discharging at −5 KV according to the static system by use of a modified machine of the electrostatic copying paper testing device (Model Sp-428, produced by Kawaguchi Denki K.K.) in which the semiconductor laser of 780 nm and its scanning unit were replaced with a tungsten light source, maintained in a dark place for one second and then exposed to laser beam for examination of the charging characteristic.

As the charging characteristics, the surface potential ($V_0$) and the exposure dosage (E1/5) necessary for decaying the potential to 1/5 when dark decayed for one second were measured.

Also, spectral absorbance of the above photosensitive member was measured by use of a momentary multi-measurement detector MCPD-100 produced by Union Giken, and evaluation of the photosensitive wavelegth region was performed with the values of the wavelength d exhibiting the steep stand-up in the spectral absorption wave form and the ratio of the height at 800 nm of spectral absorption to the height at 760 nm, namely (H 800/H 760)×100=F (flatness). In this connection, the measured wave form by MCPD-100 and the photosensitive wave form obtained by use of the above Moded SP-428 before modification with exchange of filters coincide very well with each other.

The results of the above potential characteristics and the photosensitive wavelength region measurement are shown in Table 2.

Comparative examples 7-12

Photosensitive members were prepared similarly by use of Comparative pigments 1-6 as shown above in place of the pigment used in Example 16 and evaluated similarly.

TABLE 2

| Example | Exemplary Azo pigment | $-V_O$ (−V) | E1/5 (μJ/cm²) | λ d (nm) | F (%) |
|---|---|---|---|---|---|
| 16 | 7 | 680 | 1.3 | 780 | 93 |
| 17 | 1 | 680 | 1.3 | 780 | 90 |
| 18 | 2 | 680 | 1.9 | 740 | 82 |
| 19 | 3 | 680 | 1.7 | 750 | 85 |
| 20 | 4 | 675 | 1.9 | 740 | 80 |
| 21 | 5 | 665 | 1.6 | 750 | 83 |
| 22 | 6 | 685 | 1.2 | 780 | 89 |
| 23 | 8 | 665 | 1.1 | 780 | 91 |
| 24 | 9 | 675 | 1.4 | 760 | 85 |
| 25 | 10 | 670 | 1.0 | 780 | 94 |
| 26 | 11 | 685 | 2.0 | 740 | 80 |
| 27 | 12 | 680 | 2.1 | 740 | 78 |
| 28 | 13 | 670 | 2.0 | 740 | 77 |
| 29 | 14 | 680 | 1.1 | 780 | 92 |
| 30 | 15 | 690 | 1.4 | 760 | 85 |
| 31 | 16 | 700 | 1.8 | 740 | 80 |
| 32 | 17 | 690 | 1.2 | 780 | 88 |
| 33 | 18 | 670 | 2.3 | 740 | 78 |
| 34 | 19 | 680 | 2.0 | 750 | 82 |
| 35 | 20 | 680 | 1.2 | 780 | 93 |
| 36 | 21 | 665 | 0.85 | 780 | 95 |
| 37 | 22 | 685 | 2.2 | 740 | 78 |
| 38 | 23 | 695 | 2.6 | 740 | 75 |
| 39 | 24 | 695 | 1.8 | 760 | 84 |
| Comparative Example | Comparative Azo pigment No. | | | | |
| 7 | 1 | 645 | 5.5 | 750 | 35 |
| 8 | 2 | 685 | 18.2 | 600 | 5 |
| 9 | 3 | 680 | — | 580 | 0 |
| 10 | 4 | 685 | 7.2 | 650 | 15 |
| 11 | 5 | 680 | 6.7 | 750 | 30 |
| 12 | 6 | 685 | 16.6 | 720 | 15 |

From the results in Table 2, it can be clearly seen that all of the photosensitive members according to the present invention have flat photosensitive wavelength regions practically between 760 and 800 nm, while it can be understood that Comparative examples have great defects particularly in the photosensitive wavelength region.

Comparative examples 40-47

By use of the photosensitive members used in Examples 1, 3, 8, 10, 15, 22, 30 and 35, fluctuations of potential at light portion and potential at dark portion were measured.

As the method, measurement was conducted by plastering the photosensitive member on the cylinder of an electrophotographic copying machine equipped with a corona charger of −5.6 kV, an exposure optical system, a developing instrument, a transfer charger, a deelectrification exposure optical system and a cleaner. For the photosensitive members of Examples 15, 22, 30 and 35, measurement was conducted with the semiconductor laser of 780 nm as the exposure optical system. The copying machine has the structure such that images can be obtained on a transfer paper as accompanied with driving of the cylinder. By use of the copying machine, the light portion potential ($V_L$) and the dark portion potential ($V_D$) at the initial stage were set at around −100 V and −600 V, respectively, for measurement of the initial $V_D$ and $V_L$, and further $V_D$, $V_L$ after used for 5000 times were measured. The results are shown in Table 3.

TABLE 3

| Example | Photosensitive member No. | Pigment Example | Initial $V_D(-V)$ | Initial $V_L(-V)$ | After 5000 sheets of successive copying $V_D(-V)$ | After 5000 sheets of successive copying $V_L(-V)$ |
|---|---|---|---|---|---|---|
| 40 | 1 | 1 | 600 | 100 | 585 | 128 |
| 41 | 3 | 3 | 590 | 100 | 580 | 120 |
| 42 | 8 | 8 | 590 | 110 | 580 | 130 |
| 43 | 10 | 13 | 600 | 90 | 590 | 115 |
| 44 | 15 | 22 | 610 | 100 | 595 | 125 |
| 45 | 22 | 6 | 600 | 95 | 590 | 120 |
| 46 | 30 | 15 | 595 | 110 | 585 | 140 |
| 47 | 35 | 20 | 600 | 95 | 585 | 125 |

Comparative examples 9–10

According to the same method as practiced in Example 40, the potential durability characteristics of the photosensitive members prepared in Comparative examples 3 and 8 were evaluated. They are called Comparative examples 9 and 10, respectively.

For Comparative example 10, a semiconductor laser of 780 nm was used as the exposure optical system. In Comparative example 9, at the initial stage, $V_D$ was $-600$ V and $V_L-100$ V, but $V_D$ was changed to $-500$ V after used for 5000 times continuously, and $V_L$ to $-220$ V. Further, for Comparative example 10, the initial $V_D-590$ V and $V_L-100$ V were changed to $V_D-490$ V and $V_L-280$ V after 5000 times. This may be considered to be caused partially because of decreased sensitivity due to temperature elevation of the semiconductor laser and shifting to longer wavelength of the oscillated wavelength.

Anyway, it could be sufficiently understood that the stability of the potential of the photosensitive member according to the present invention is good.

EXAMPLE 48

On the charge generation layer prepared in Example 1, a coating solution prepared by dissolving 5 g of 2,4,7-trinitro-9-fluorenone and 5 g of poly-4,4'-dioxydiphenyl-2,2'-propane carbonate (molecular weight 300,000) dissolved in 70 ml of tetrahydrofuran was applied to a coated amount after drying of 10 g/m$^2$, followed by drying.

The electrophotographic photosensitive member thus prepared was subjected to measurement of charging according to the same method as in Example 1. In this case, the charging polarity was made +. The results are shown in Table 4.
Table 4
$V_0 + 660$ V
$E_{\frac{1}{2}}$ 2.5 lux.sec.

EXAMPLE 49

On an aluminum cylinder was applied by coating an aqueous ammoniacal solution of casein (casein 11.2 g, 28% ammonia water 1 g, water 222 ml) according to the dip coating method, followed by drying, to form a subbing layer with a coated amount of 1.0 g/m$^2$.

Next, 1 part by weight of the azo pigment No. 18 as mentioned above, 1 part by weight of a butyral resin (Ethlec BM-2, produced by Sekisui Kagaku K.K.) and 30 parts by weight of isopropyl alcohol were dispersed by means of a ball mill dispersing machine. The dispersion was applied by coating on the subbing layer previously formed according to the dip coating method, followed by drying, to form a charge generation layer. The film thickness was 0.3 μm.

Next, 1 part by weight of 4-diphenylamino-4'-methoxy-stylbenzene, 1 part by weight of a polysulfone resin (P1700: produced by Union Carbide Co.) and 6 parts by weight of monochlorobenzene were mixed and dissolved by stirring with a stirrer. The solution was applied on the charge generation layer according to the dip coating method, followed by drying, to form a charge transport layer. The film thickness was 15 μm.

The photosensitive member thus prepared was subjected to corona discharging at $-5$ kV. The surface potential at this time was measured (initial potential $V_0$). Further, the surface potential after the photosentive member was left to stand in a dark place for 5 seconds was measured (dark decay $V_K$). The sensitivity was evaluated by measuring the exposure dosage ($E_{\frac{1}{2}}$ μJ/cm$^2$) necessary for decaying the potential $V_K$ after dark decay. During this measurement, a ternary element semiconductor laser of gallium/aluminum/arsenic was used as the light source (output: 5 mW; oscillation wavelength 780 nm). These results were as follows.
Vo: $-660$ V
Potential retentivity ($V_K/V_0 \times 100$): 94%
$E_{\frac{1}{2}}$: 0.9 μJ/cm$^2$ Next, the above photosensitive member was set on a laser beam printer (LBP-CX) which is an electropotographic system printer of the reversal development system equipped with a semiconductor laser as described above, and real image forming test was conducted. The conditions are as follows.

Surface potential after primary charging: $-700$ V, Surface potential after imagewise exposure: $-150$ V (exposure dosage 1.2 μJ/cm$^2$), Transfer potential: $+700$ V, Developer polarity: negative, Process speed: 50 mm/sec., Developing condition (Developing bias): $-450$ V, Image exposure scanning system: image scan, Exposure before primary charging: 50 lux.sec. Red whole surface exposure image formation was performed under these conditions according to line scanning of the laser beam following the letter signals and image signals, whereby good prints of both letters and signals good could be obtained.

EXAMPLE 50

On the aluminum surface of a polyethylene terephthalate film having aluminum vapor deposited thereon, a thick polyvinyl alcohol coating was formed.

Next, the dispersion of the azo pigment used in Example 1 was applied on the polyvinyl alcohol layer previously formed by a Meyer bar to a film thickness after drying of 0.5 μm, followed by drying, to form a charge generation layer.

Subsequently, a solution of 5 g of a pyrazoline compound of the structural formula:

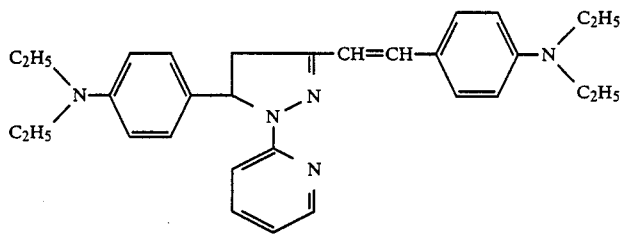

and 5 g of a polyarylate resin (polycondensate of bisphenol A with terephthalic acid-isophthalic acid) dissolved in 70 ml of tetrahydrofuran was applied on the charge generation layer to a film thickness of 10 μm after drying on the charge generation layer, and dried to form a charge transport layer.

The charging chracteristic and durability characteritic of the photosensitive member thus prepared were measured according to the same methods as in Example 1 and Example 40. The results are shown in Table 5.
Table 5
$V_o$: −690 V
$E_{\frac{1}{2}}$: 2.3 lux.sec

| Durability characteristic | | | |
|---|---|---|---|
| Initial stage | | After succesive copying of 5000 sheets | |
| VD | VL | VD | VL |
| −600 V | −100 V | −585 V | −125 V |

From the results in Table 5, it can be seen that sensitivity is also good and also potential stability during prolonged usage is good.

EXAMPLE 51

On a 100 μm thick aluminum plate, an aqueous ammoniacal solution of casein was applied and dried to form a subbing layer with a film thickness of 0.5 μm.

Next, a charge transfer complex compound was formed by dissolving 5 g of 2,4,7-trinitro-9-fluorenone and 5 g of a poly-N-vinylcarbazole (number average moleculr weight: 300,000) in 70 ml tetrahydrofuran. The charge transfer complex compound and 1 g of the above exemplary azo pigment No. 5 were added into a solution of 5 g of a polyester resin (Byron, produced by Toyobo) dissolved in 70 ml of tetrahydrofuran and dispersed therein. The dispersion was applied on the subbing layer to a film thickness after drying of 12 μm and dried.

The charging characteristic of the photosensitive member thus prepared was measured according to the same method as in Example 1. The results are shown in Table 6. The charging polarity was made +.
Table 6
$V_o$: +640 V
$E_{\frac{1}{2}}$: 3.0 lux.sec.

EXAMPLE 52

On the casein layer of the aluminum substrate applied with the casein layer used in Example 1 were successively laminated the charge transport layer and the charge generation layer of Example 1 to form a photosensitive layer in the same manner except that the layer constitution was different, and the charging was measured similarly as described in Example 1. However, the charging polarity was made +. The charging characteristic is shown in Table 7.
Table 7
$V_o$: +635 V
$E_{\frac{1}{2}}$: 2.8 lux.sec.

Further, durability stability was evaluated in the same manner except that charging was made + to obtain the following results.

| Initial stage | | After 5000 sheets | |
|---|---|---|---|
| VD | VL | VD | VL |
| +600 V | +100 V | +580 V | +115 V |

What is claimed is:

1. An electrophotographic photosensitive member having a photosensitive layer on an electroconductive support, wherein said photosensitive layer contains a compound represented by the formula (1):

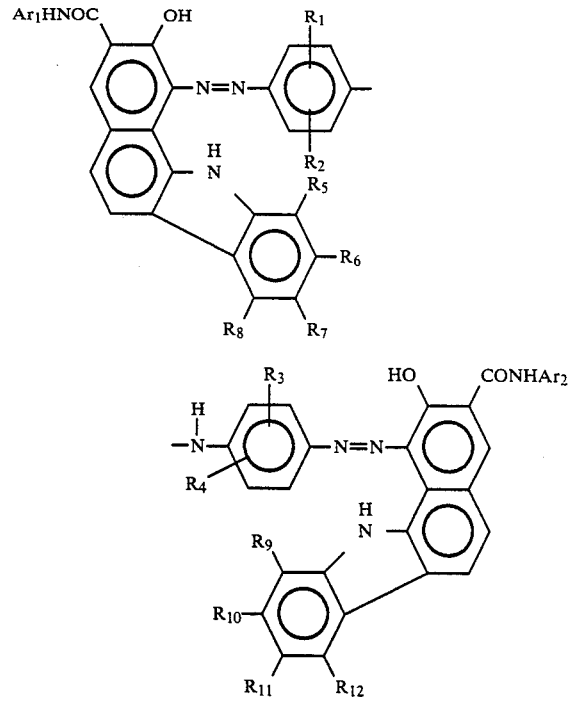

wherein $Ar_1$ represents a phenyl group having one or more groups selected from alkoxy groups and alkyl groups, $Ar_2$ represents a phenyl group having one or more groups selected from nitro groups, cyano groups and halogen atoms, $R_1$, $R_2$, $R_3$, $R_4$, $R_5$, $R_6$, $R_7$, $R_8$, $R_9$, $R_{10}$, $R_{11}$ and $R_{12}$ represent hydrogen atom, halogen atom, alkyl group, aralkyl group, alkoxy group, nitro group, cyano group, trifluoromethyl group or substituted amino group, with proviso that $R_5$ and $R_6$, $R_6$ and $R_7$, $R_7$ and $R_8$, $R_9$ and $R_{10}$, $R_{10}$ and $R_{11}$, $R_{11}$ and $R_{12}$ may form a fused aromatic ring together with a part of the carbazole ring.

2. An electrophotographic photosensitive member according to claim 1, wherein $Ar_1$ in the above formula (1) is a phenyl group having one or more alkoxy groups and $Ar_2$ is a phenyl groups having one or more nitro groups.

3. An electrophotographic photosensitive member according to claim 1, wherein $Ar_1$ in the above formula (1) is a phenyl group having one or more alkoxy groups and $Ar_2$ is a phenyl groups having one or more cyano groups.

4. An electrophotographic photosensitive member according to claim 1, wherein $Ar_1$ in the above formula (1) is a phenyl group having one or more alkoxy groups and $Ar_2$ is a phenyl groups having one or more halogen atoms.

5. An electrophotographic photosensitive member according to claim 1, wherein $Ar_1$ in the above formula (1) is a phenyl group having one or more alkyl groups and $Ar_2$ is a phenyl groups having one or more groups selected from nitro groups, cyano groups and halogen atoms.

6. An electrophotographic photosensitive member according to claim 1, wherein said photosensitive layer has laminate constitution of a charge generation layer and a charge transport layer and said charge generation layer contains a compound represented by the above formula (1).

7. An electrophotographic photosensitive member according to claim 2, wherein said photosensitive layer has laminate constitution of a charge generation layer and a charge transport layer and said charge generation layer contains a compound represented by the above formula (1).

8. An electrophotographic photosensitive member according to claim 3, wherein said photosensitive layer has laminate constitution of a charge generation layer and a charge transport layer and said charge generation layer contains a compound represented by the above formula (1).

9. An electrophotographic photosensitive member according to claim 4, wherein said photosensitive layer has laminate constitution of a charge generation layer and a charge transport layer and said charge generation layer contains a compound represented by the above formula (1).

10. An electrophotographic photosensitive member according to claim 5, wherein said photosensitive layer has laminate constitution of a charge generation layer and a charge transport layer and said charge generation layer contains a compound represented by the above formula (1).

11. An electrophotographic photosensitive member according to claim 1, wherein said photosensitive layer contains a compound represented by the above formula (1) and a charge transporting substance.

12. An electrophotographic photosensitive member according to claim 2, wherein said photosensitive layer contains a compound represented by the above formula (1) and a charge transporting substance.

13. An electrophotographic photosensitive member according to claim 3, wherein said photosensitive layer contains a compound represented by the above formula (1) and a charge transporting substance.

14. An electrophotographic photosensitive member according to claim 4, wherein said photosensitive layer contains a compound represented by the above formula (1) and a charge transporting substance.

15. An electrophotographic photosensitive member according to claim 5, wherein said photosensitive layer contains a compound represented by the above formula (1) and a charge transporting substance.

16. An electrophotographic apparatus provided with at least an exposure means of a laser optical system and an electrophotographic photosensitive member having a photosensitive layer containing a compound represented by the following formula (1), formed on a conductive substrate:

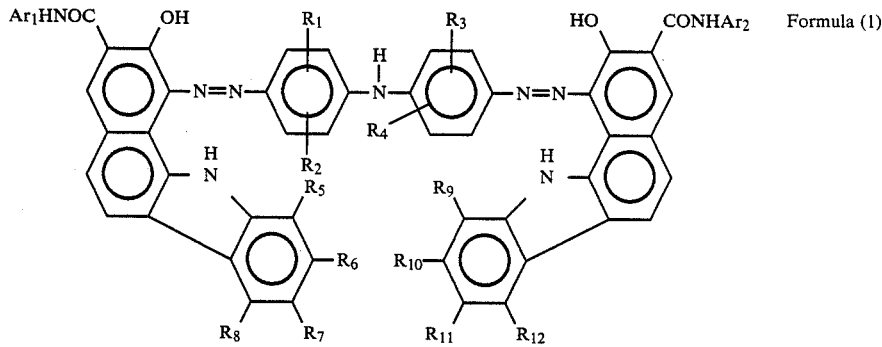

Formula (1)

wherein $Ar_1$ represents a phenyl group having one or more groups selected from alkoxy groups and alkyl groups, $Ar_2$ represents a phenyl groups having one or more groups selected from nitro groups, cyano groups and halogen atoms, $R_1$, $R_2$, $R_3$, $R_4$, $R_5$, $R_6$, $R_7$, $R_8$, $R_9$, $R_{10}$, $R_{11}$ and $R_{12}$ represent hydrogen atom, halogen atom, alkyl group, aralkyl group, alkoxy group, nitro group, cyano group, trifluoromethyl group or substituted amino group, with proviso that $R_5$ and $R_6$, $R_6$ and $R_7$, $R_7$ and $R_8$, $R_9$ and $R_{10}$, $R_{10}$ and $R_{11}$, $R_{11}$ and $R_{12}$ may form a fused aromatic ring together with a part of the carbazole ring.

* * * * *

UNITED STATES PATENT AND TRADEMARK OFFICE
CERTIFICATE OF CORRECTION

PATENT NO. : 4,820,602
DATED : April 11, 1989
INVENTOR(S) : MASAKAZU MATSUMOTO

It is certified that error appears in the above-identified patent and that said Letters Patent is hereby corrected as shown below:

IN [54] TITLE

"PHOTOSENITIVE" should read --PHOTOSENSITIVE-- and "NON-SYMETRIC" should read --NON-SYMMETRIC--.

IN [57] ABSTRACT

Line 16 from end, "group" should read --groups--.
Line 14 from end, "group" should read --groups--.
Line 12 from end, "represnt" should read --represent--.
Line 5 from end, "electrophotographyic" should read --electrophotographic--.

COLUMN 1

Line 1, "PHOTOSENITIVE" should read --PHOTOSENSITIVE--.
Line 3, "NON-SYMETRIC" should read --NON-SYMMETRIC--.
Line 45, "disazo-" should read --disazo--.
Line 46, "disazopigments" should read --disazo pigments--.

COLUMN 2

Line 50, "phenyl groups" should read --phenyl group--.
Line 51, "group" should read --groups--.
Line 63, "with" should be deleted.

UNITED STATES PATENT AND TRADEMARK OFFICE
CERTIFICATE OF CORRECTION

PATENT NO. : 4,820,602
DATED : April 11, 1989
INVENTOR(S) : MASAKAZU MATSUMOTO

It is certified that error appears in the above-identified patent and that said Letters Patent is hereby corrected as shown below:

COLUMN 3

Line 16, "Arl" should read --$Ar_1$--.

COLUMN 4

Line 31, "Arl" should read --$Ar_1$--.
Line 66, "Arl" should read --$Ar_1$--.

COLUMN 7

"CONHAr" should read --$CONHAr_2$--.

COLUMN 30

Line 28, "filtrtion" should read --filtration--.

COLUMN 31

Line 23, "contacted electrically" should read --contacted electrically to--.

COLUMN 34

Line 43, "obtain" should read --obtaining--.

COLUMN 41

Line 27, "used" should read --being used--.

UNITED STATES PATENT AND TRADEMARK OFFICE
CERTIFICATE OF CORRECTION

PATENT NO. : 4,820,602

DATED : April 11, 1989

INVENTOR(S) : MASAKAZU MATSUMOTO

Page 3 of 3

It is certified that error appears in the above-identified patent and that said Letters Patent is hereby corrected as shown below:

COLUMN 45

Line 8, "phenyl groups" should read --phenyl group--.
   Line 13, "phenyl groups" should read --phenyl group--.
   Line 18, "phenyl groups" should read --phenyl group--.
   Line 23, "phenyl groups" should read --phenyl group--.

COLUMN 46

Line 51, "phenyl groups" should read --phenyl group--.

Signed and Sealed this

Thirteenth Day of March, 1990

Attest:

JEFFREY M. SAMUELS

*Attesting Officer*    *Acting Commissioner of Patents and Trademarks*